United States Patent
Park

(10) Patent No.: US 10,569,990 B2
(45) Date of Patent: Feb. 25, 2020

(54) TV-INTEGRATED CABLE ORGANIZATION DEVICE

(71) Applicant: SPREEO, Seoul (KR)

(72) Inventor: Kwan Kyu Park, Seoul (KR)

(73) Assignee: SPREEO, Seoul (KR)

( * ) Notice: Subject to any disclaimer, the term of this patent is extended or adjusted under 35 U.S.C. 154(b) by 75 days.

(21) Appl. No.: 15/752,217

(22) PCT Filed: Mar. 13, 2017

(86) PCT No.: PCT/KR2017/002681
§ 371 (c)(1),
(2) Date: Feb. 12, 2018

(87) PCT Pub. No.: WO2017/160038
PCT Pub. Date: Sep. 21, 2017

(65) Prior Publication Data
US 2019/0071279 A1 Mar. 7, 2019

(30) Foreign Application Priority Data

Mar. 14, 2016 (KR) .................. 10-2016-0030121

(51) Int. Cl.
| | |
|---|---|
| *H02G 3/04* | (2006.01) |
| *B65H 75/36* | (2006.01) |
| *B65H 75/44* | (2006.01) |
| *H02G 11/00* | (2006.01) |
| *H02G 11/02* | (2006.01) |

(52) U.S. Cl.
CPC ............ *B65H 75/36* (2013.01); *B65H 75/366* (2013.01); *B65H 75/446* (2013.01); *B65H 75/4476* (2013.01); *H02G 11/00* (2013.01); *B65H 2701/34* (2013.01); *H02G 11/02* (2013.01)

(58) Field of Classification Search
CPC ......... B65H 75/04; B65H 75/18; H02G 11/02
USPC ...... 248/68.1, 918; 348/825; 242/615.3, 431, 242/388.9; 174/68.1, 255, 126.1
See application file for complete search history.

(56) References Cited

U.S. PATENT DOCUMENTS

2012/0080565 A1* 4/2012 Gallup ................ H02G 3/0443
 248/68.1
2014/0299719 A1* 10/2014 Wolff ..................... F16L 3/221
 248/71

FOREIGN PATENT DOCUMENTS

| KR | 20-1998-0035835 U | | 9/1998 |
|---|---|---|---|
| KR | 20-0341877 | * | 2/2004 |
| KR | 20-0341877 Y1 | | 2/2004 |
| KR | 20-2009-0007765 U | | 7/2009 |
| KR | 20-2011-0006775 | * | 7/2011 |
| KR | 20-2011-0006775 U | | 7/2011 |
| KR | 10-1311219 B1 | | 9/2013 |
| WO | WO-2017160038 A1 | * | 9/2017 ............. H02G 11/00 |

* cited by examiner

*Primary Examiner* — Todd M Epps
(74) *Attorney, Agent, or Firm* — Patent Office of Dr. Chung Park

(57) ABSTRACT

The present invention relates to a TV cable organization device and, particularly, to a TV-integrated cable organization device capable of neatly organizing messy cables by winding, around a cable winding part provided on the back panel of a TV, cables of the TV and peripheral devices connected to the TV such that the cables are organized.

7 Claims, 11 Drawing Sheets

TV-INTEGRATED CABLE ORGANIZATION DEVICE

CROSS-REFERENCE TO PRIOR APPLICATIONS

This application is a national Stage Patent Application of PCT International Patent Application No. PCT/KR2017/002681, filed on Mar. 13, 2017 under 35 U.S.C. § 371, which claims priority of Korean Patent Application No. 10-2016-0030121, filed on Mar. 14, 2016, which are all hereby incorporated by reference in their entirety.

TECHNICAL FIELD

The present invention relates to a TV cable organization device of a TV such as an LCD TV, LED TV, PDP TV or the like, and particularly, to a TV-integrated cable organization device configuring a cable organization device to be integrated with a back panel of a TV, which can neatly wind and organize cables such as power cables and signal cables of the TV and various peripheral devices connected to the TV behind the TV.

BACKGROUND ART

As LCD, LED and PDP TVs are developed and distributed passing the era of cathode-ray tube TV, TVs are promptly increased in size and provided with input and output terminals of various specifications to receive and play back video and audio signals transmitted from a game console, a set-top box, a video player, a smartphone or the like, not simply viewing a program transmitted from a broadcasting station.

Furthermore, TVs are diversely utilized, such as directly connecting to the Internet and doing Internet searches or streaming videos or music through the Internet.

TVs are combined with diverse peripheral devices and utilized for various purposes recently as described above, and there is a problem in that the outer appearance is spoiled as the power cables and signal cables of diverse peripheral devices including the TV are complicatedly and dizzily tangled around the TV, and it is difficult to clean the area since dusts are piled up around the tangled cables.

DISCLOSURE OF INVENTION

Technical Problem

Therefore, the present invention has been made in view of the above problems, and it is an object of the present invention to provide a cable organization device which can cleanly and neatly organize power cables and signal cables of a TV and various peripheral devices connected to the TV by winding the cables on the back panel of the TV.

Technical Solution

To accomplish the above object, according to one aspect of the present invention, there is provided a TV-integrated cable organization device comprising a predetermined number of cable winding units configured on a back panel of a TV, the cable winding unit including: a pair of support bars spaced apart from each other by a predetermined distance, one end of which is fastened to the back panel of the TV using a fastening means; and a connection bar for connecting end portions of the support bars, wherein cables are organized by winding the cables around the cable winding units.

At this point, it is preferable that auxiliary support bars are formed in the connection bar to be protruded in a direction perpendicular to the connection bar, to organize the cables by winding the cables around the auxiliary support bars.

In addition, it is preferable that an auxiliary support bar is formed between the support bars in a direction the same as an axis direction of the connection bar, to organize the cables by winding the cables around the auxiliary support bar.

In addition, it is preferable that the TV-integrated cable organization device further comprises a power strip mount for fastening and fixing a power strip on the back panel so that the power strip, as well as the cables, is not seen.

At this point, the power strip mount is configured of a fixing plate having fastening holes corresponding to VESA holes of the back panel; and a support plate having fastening holes corresponding to the fastening holes of the fixing plate at one side and attaching the power strip, wherein the fixing plate is fastened and fixed to the back panel by fastening bolts in the fastening holes of the fixing plate and the VESA holes of the back panel, and the support plate is fastened and fixed to the fixing plate by fastening bolts in the fastening holes of the fixing plate and the fastening holes of the support plate.

In addition, it is preferable that an axis is formed at an end portion of each support bar of the cable winding unit in the form of extending and bending the support bar, wherein any one axis of the cable winding unit is fastened to the back panel using a hinge, and the other axis of the cable winding unit is fastened to a rotation fixing piece to rotate and fix the cable winding unit in a folded or unfolded state.

At this point, the rotation fixing piece includes: a body fastened to the back panel; a rotation space formed in the body in the form of a groove, into which the support bar of the cable winding unit is inserted; and a stopper with an open side formed in the rotation space to be protruded in a direction perpendicular to the support bar, wherein as the connection bar or the support bar of the cable winding unit is elastically strained and the support bar moves from the inside of the rotation space to the open portion of the stopper and rotates, the cable winding unit is folded or unfolded, and as the connection bar or the support bar is elastically restored and the support bar moves from the inside the rotation space to one side of the stopper, the cable winding unit is fixed in a folded or unfolded state.

In addition, it is preferable that a storage unit is formed on the back panel in the form of a groove and the rotation fixing piece is fastened to any one axis of the cable winding unit and therefore the cable winding unit is stored and folded or unfolded in the storage unit, to store the cable winding unit in the storage unit in a folded state.

In addition, it is preferable that a door is hinge-fastened to the storage unit to open and close the storage unit.

Advantageous Effects

Since the TV-integrated cable organization device of the present invention configured as described above organizes power cables and signal cables of a TV and various peripheral devices connected to the TV by winding the cables on the back panel of the TV, the appearance looks clean as the cable are not seen from the front of the TV, and since the cables are wound after being classified by the TV and the peripheral devices connected to the TV, the cables can be promptly and conveniently separated when a peripheral device is disconnected.

Figure 1A:
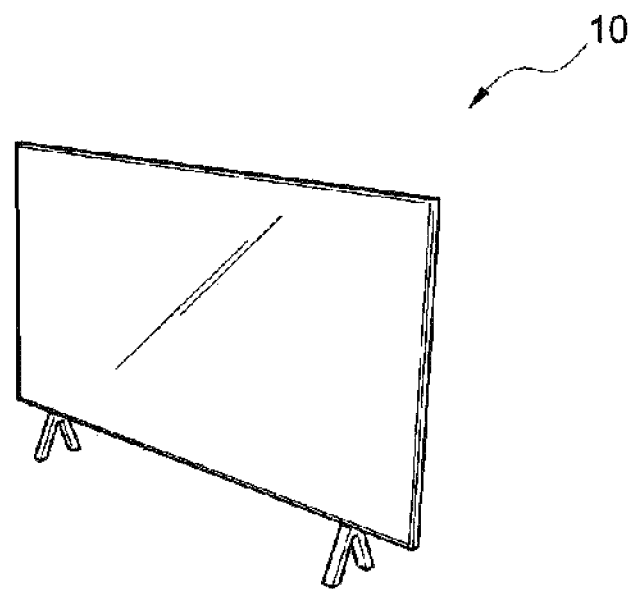
FIGS. 1(a) and 1(b) are perspective views respectively showing the front and rear sides of a TV.

| DESCRIPTION OF SYMBOLS | |
|---|---|
| 10: | TV |
| 11: | back panel |
| 12: | VESA hole |
| 13: | fastening hole |
| 20: | power strip |
| 100: | cable winding unit |
| 101: | fastening hole |
| 102: | support bar |
| 103: | connection bar |
| 104: | auxiliary support bar |
| 105: | auxiliary connection bar |
| 106: | axis |
| 110: | rotation fixing piece |
| 111: | body |
| 112: | rotation space |
| 113: | stopper |
| 120: | hinge |
| 130: | storage unit |
| 131: | door |
| 132: | handle |
| 200: | power strip mount |
| 210: | fixing plate |
| 211: | fastening hole |
| 220: | support plate |
| 221: | rib |
| 222: | fastening hole |

BEST MODE FOR CARRYING OUT THE INVENTION

The present invention will be hereafter described in detail, with reference to the preferred embodiments of the present invention and the accompanying drawings, and it will be described assuming that elements having like functions will be denoted by like reference numerals.

When it is referred that an element "includes" another element in the detailed description or claims of the present invention, it should be understood that this is not interpreted as being limited to only one corresponding element as far as an opposed description is not specially specified, but may further include other elements.

Figure 1B:
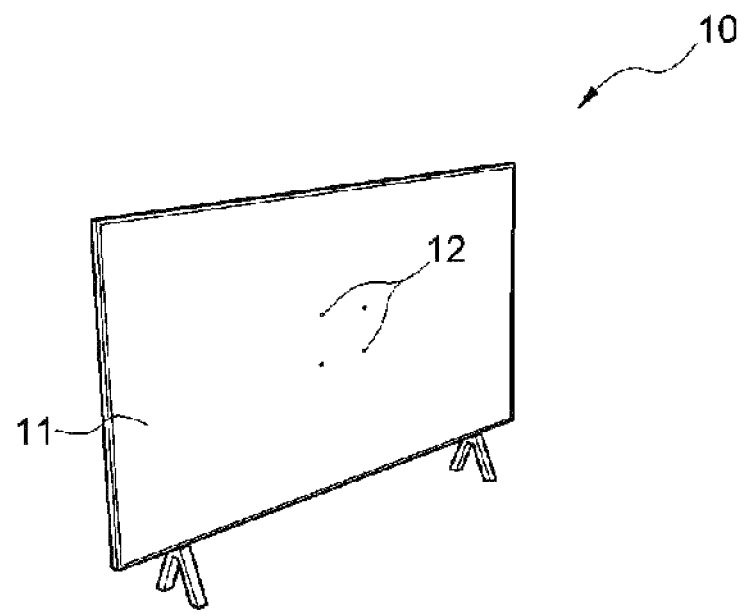

Recently, both the display panel on the front side and the back panel 11 on the rear side of a TV 10 are manufactured in a flat shape as shown in FIG. 1.

In the present invention, as a cable organization device is configured on the flat back panel 11 of the TV 10, wound cables are not seen from the front of the TV 10.

First Embodiment

Figure 2:
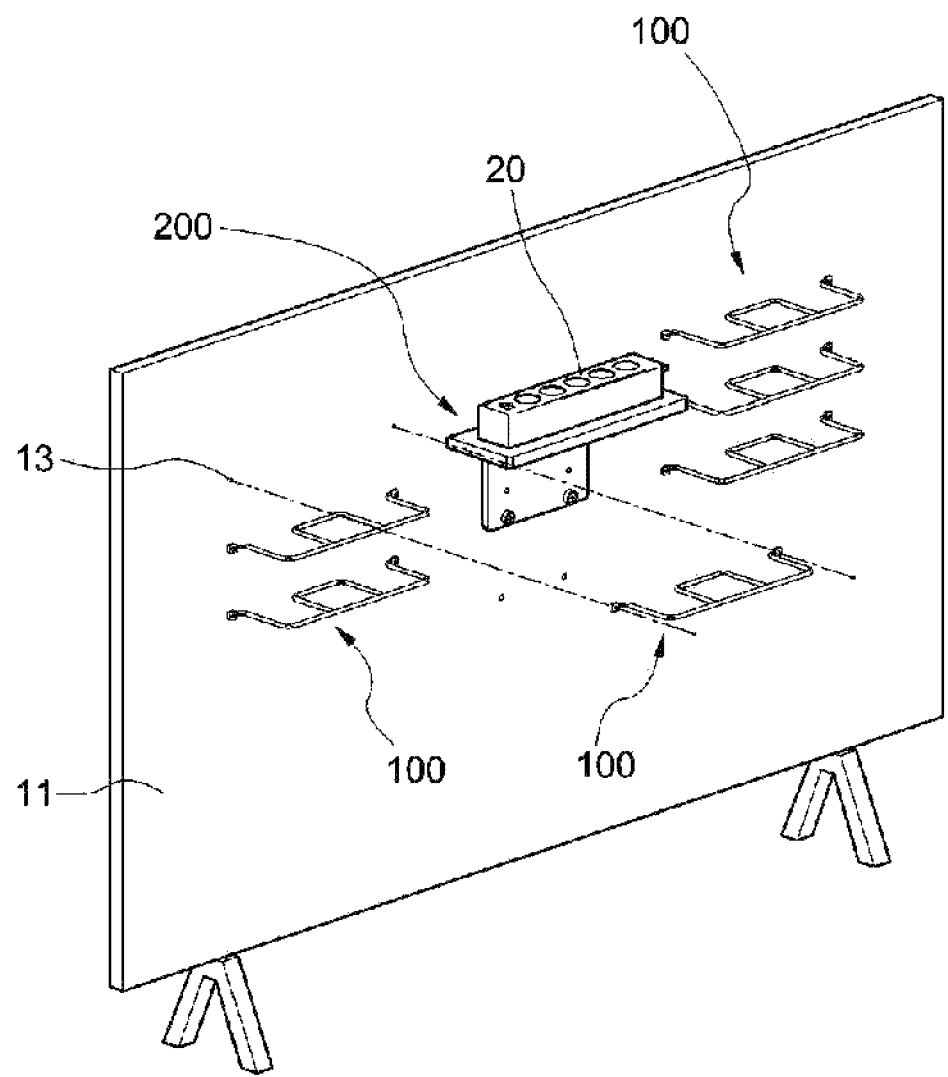
FIG. 2 is a perspective view showing a first embodiment of the present invention.

As shown in FIG. 2, a first embodiment of the present invention is configured of a cable winding unit 100 for winding power cables and signal cables on the back panel 11 of a TV 10, and a power strip mount 200 which can install a power strip 20 for supplying power to various peripheral devices.

Figure 3:
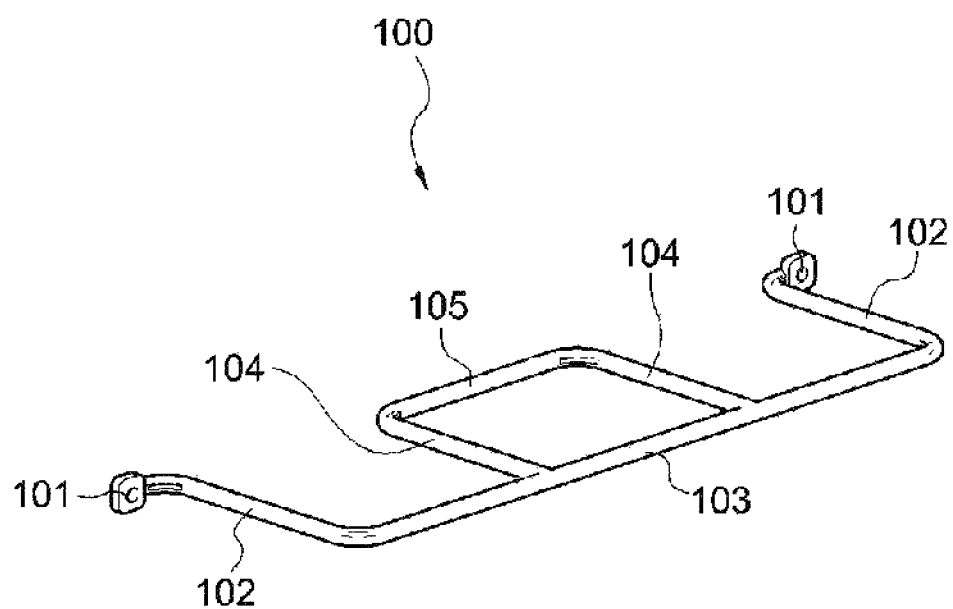
FIG. 3 is a perspective view showing a cable winding unit of the present invention.

As shown in FIG. 3, the cable winding unit 100 is configured of a pair of support bars 102 protruded from the back panel 11 of the TV 10 in the vertical direction and spaced apart from each other by a predetermined distance, and a connection bar 103 for connecting the pair of support bars 102.

As a fastening bolt is inserted into a fastening hole 101 formed at an end portion of the support bar 102 and screw-coupled to the back panel 11, a predetermined number of cable winding units 100 are fastened and fixed to the back panel 11 of the TV as shown in FIG. 2.

Cables can be organized by winding the cables, in the horizontal direction, around a pair of support bars 102 of the cable winding unit 100 configured as described above, or if a plurality of cable winding units 100 is installed to be spaced apart from each other by a predetermined interval in the vertical direction as shown in FIG. 2, the cables may be organized by winding the cables in the vertical direction using two connection bars 103 of the cable winding unit 100.

At this point, as shown in FIGS. 2 and 3, cables may be organized by winding the cables in the horizontal direction using the configuration of 'support bar 102-auxiliary support bar 104' or 'auxiliary support bar 104-auxiliary support bar 104' by installing auxiliary support bars 104 fastened to the connection bar 103 in the vertical direction in the middle of the connection bar 103 of the cable winding unit 100.

Although it is described in the embodiment shown in FIG. 3 that two auxiliary support bars 104 are formed in the connection bar 103, one or more auxiliary support bars 104 can be formed.

In addition, as an auxiliary connection bar 105 for horizontally connecting the end portions of the support bars 104 is formed as shown in FIG. 3, cables may be organized by winding the cables using the auxiliary connection bar 105 and the connection bar 103.

In addition, the power strip mount 200 for supplying power to various peripheral devices including the TV is formed on the back panel 11 of the TV 10.

Four VESA holes 12 are formed on the back panel 11 of the TV 10.

Generally, a TV is provided with legs installed on the bottom so that the TV may be put upright on a TV stand as shown in FIG. 1, or a TV is hung on a wall to be used in the form of a wall-mounted TV.

A TV is fastened and fixed on the wall using a separate bracket to hang the TV on the wall, and to fasten the bracket to the TV, VESA holes 12 are formed on the back panel 11 of the TV when the TV is manufactured.

The VESA hole 12 is the abbreviation of Video Electronics Standards Association hole, which is an installation interface standard for installing a stand or a cradle on a display and refers to holes for installing four screws in the back panel 11.

Figure 4:
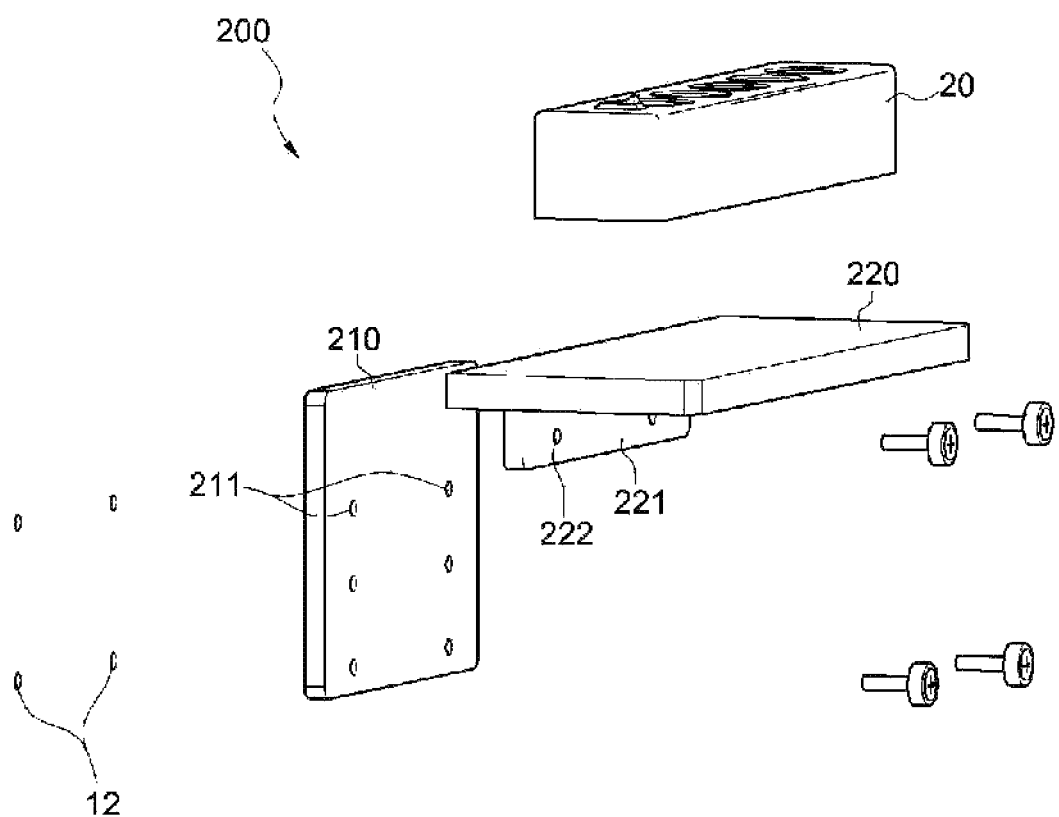
FIG. 4 is a perspective view showing a power strip mount of the present invention.

The power strip mount 200 is configured to be installed in the VESA holes 12 formed on the back panel 11 and fix a power strip 20, and as shown in FIG. 4, the power strip mount 200 is configured of a fixing plate 210 fastened to the VESA holes 12 of the back panel 11, and a support plate 220 fastened to the fixing plate 210 to support the power strip.

The fixing plate 210 is shaped in the form of a flat panel as shown in FIG. 4, and a predetermined number of fastening holes 211 are formed in the shape of a hole, and as at least two fastening holes 211 among the fastening holes 211 are formed to be aligned with the VESA holes 12 formed on the back panel 11, the fixing plate 210 is fastened to the VESA holes 12 formed on the back panel 11 of the TV 10 by adjusting the position of the fixing plate 210.

In addition, the support plate 220 is fastened to the fixing plate 210, and the support plate 220 is shaped in the form of a flat panel. A rib 221 provided with fastening holes 222 is formed at one side, and the support plate 220 is fastened and fixed to the fixing plate 210 by aligning the fastening holes 222 of the rib 221 with the fastening holes 211 of the fixing plate 210 and fastening them using bolts.

As the power strip 20 for supplying power to the TV and various peripheral devices is hidden behind the TV by attaching and fixing the power strip to the support plate 220 using various already-known fastening and fixing means, the power strip 20 and the cables connected to the power strip 20 are hidden from the outside by the TV 10.

As the cables of the TV 10 and various peripheral devices connected to the TV are organized by winding the cables around the cable winding unit 100 of the present invention installed on the back panel 11 of the TV 10 and the power strip 20 is fixed to the back panel of the TV 10 using the power strip mount 100 through the present invention as described above, the area around the TV 10 can be neatly organized by hiding the power strip 20 and various cables behind the TV 10.

Second Embodiment

A cable winding unit 100 of the second embodiment of the present invention may be configured to be folded as needed.

Figure 5:
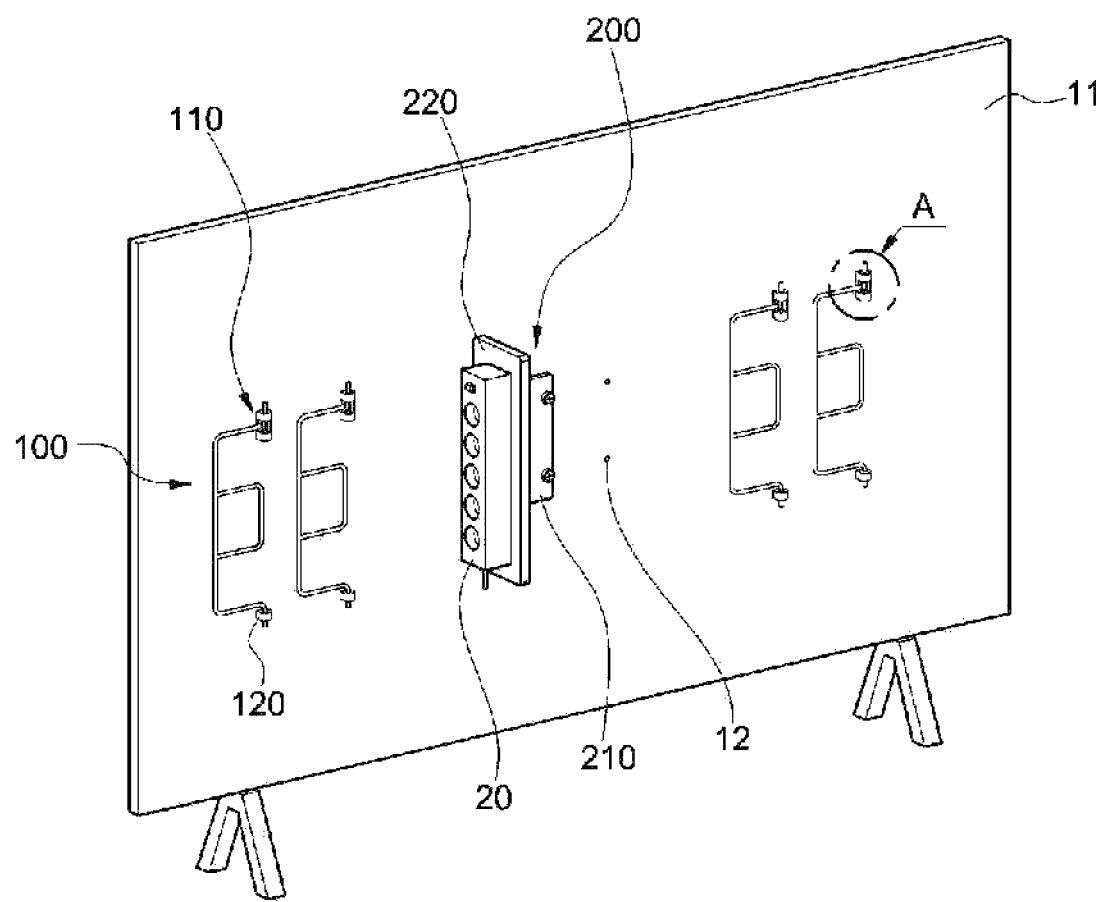
FIG. 5 is a perspective view showing a second embodiment of the present invention.
Figure 6:
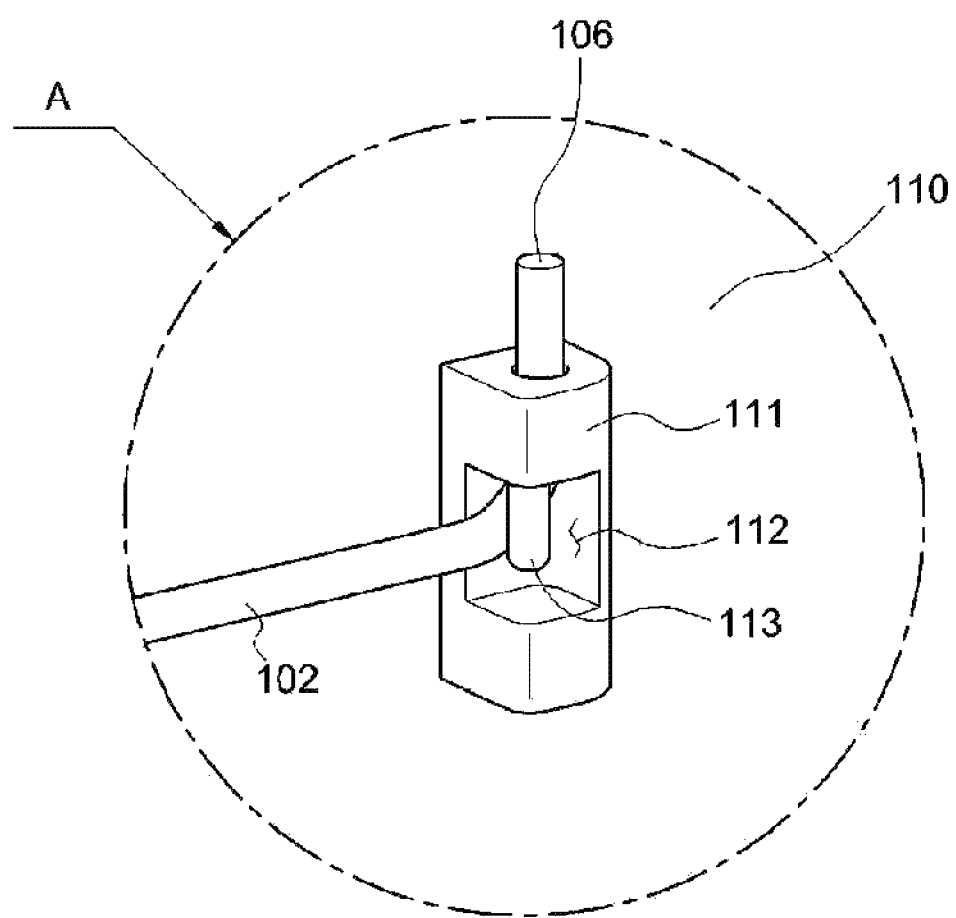
FIG. 6 is an enlarged perspective view showing the rotation fixing piece of FIG. 5.
Figure 7:
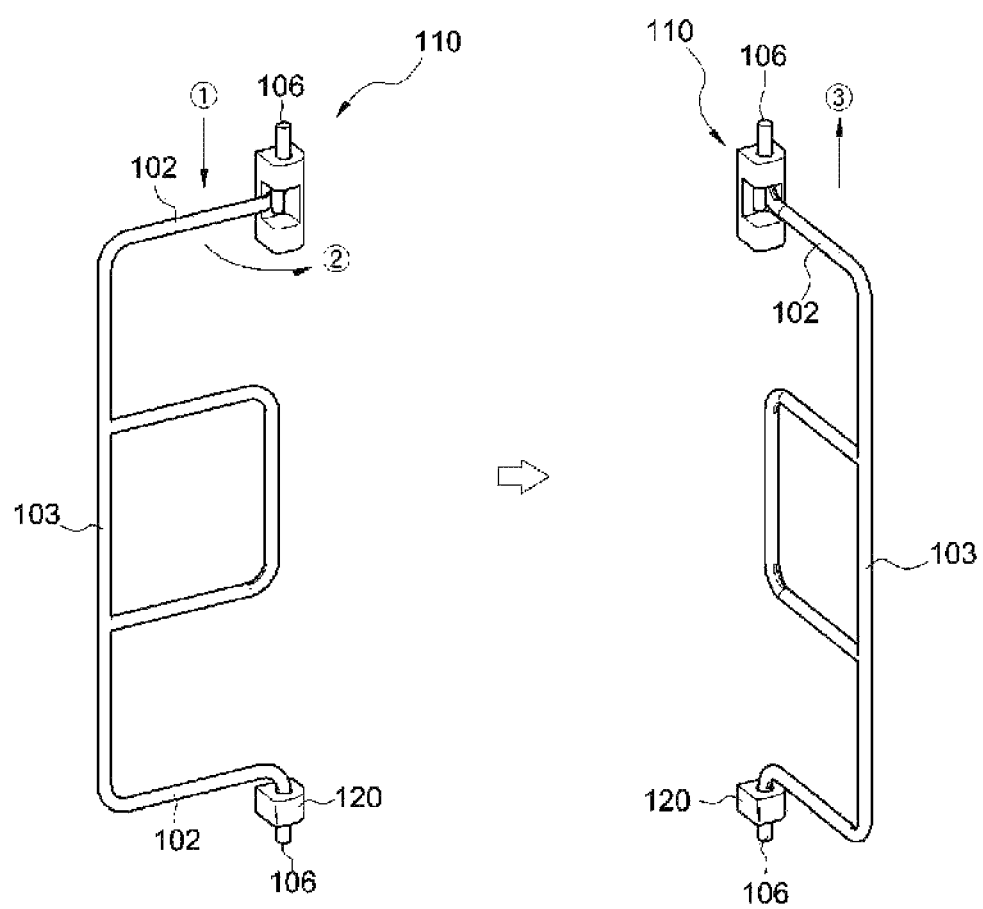
FIG. 7 is a use state view showing a use state of a cable winding unit according to a second embodiment of the present invention.

In the cable winding unit according to the second embodiment, as shown in FIGS. 5 to 7, a support bar 102 perpendicular to the connection bar 103 is formed at both end portions of the connection bar 103, and an axis 106 is formed at an end portion of the support bar 102 in the form of extending and bending the support bar 102.

In addition, any one axis 106 among a pair of axes 106 is fastened to a hinge 120 to be rotatable on the back panel 11 of the TV 10, and the other axis 106 is fastened to the back panel 11 of the TV 10 using a rotation fixing piece 110.

The rotation fixing piece 110 is for fixing the cable winding unit 100 in a folded or unfolded state on the back panel 11 of the TV 10, and as shown in FIG. 6, a rotation space 112 is formed at the center of a body 111 in the form of a groove, and the support bar 102 of the cable winding unit 100 is inserted into the rotation space 112, and the axis 106 at the end of the support bar 102 is inserted into a hole formed on the body 111 of the rotation fixing piece 110.

At this point, a stopper 113 with an open side is formed in the rotation space 111 in a direction perpendicular to the support bar 102.

A process of rotating and fixing the cable winding unit 100 configured as described above onto the back panel 11 is described.

FIG. 7 is a view showing a state of rotating and fixing the cable winding unit 100 while the cable winding unit 100 in a rotated and unfolded state, when the cable winding unit 100 is folded and tightly attached to the back panel 11 of the TV 10.

In the initial state of FIG. 7, i.e., when the cable winding unit 100 is folded, the cable winding unit 100 is fixed in a folded state as an end portion of the support bar 102 of the cable winding unit 100 is latched and folded by the stopper 113 of the rotation fixing piece 110.

If the support bar 102 fastened to the rotation fixing piece 110 is pressed in the direction of the hinge 120 to unfold the folded cable winding unit 100, the connection bar 103 and the support bar 102 shaped using metal or synthetic resin as a material are elastically strained, and an end portion of the support bar 102 moves from the rotation space 112 of the rotation fixing piece 110 to the open portion of the stopper 113.

In this state, since the support bar 102 of the cable winding unit 100 is positioned in an area out of the stopper 113 inside the rotation space 112, the cable winding unit 100 is able to rotate.

In addition, if the cable winding unit 100 is unfolded, the axes 106 of the cable winding unit 100 respectively rotate around the rotation fixing piece 110 and the hinge 120, and the cable winding unit 100 is unfolded as shown in FIG. 7.

If the force pressing the support bar 102 is removed while the cable winding unit 100 is rotated and unfolded as described above, the end portion of the support bar 102 moves toward the stopper 113 of the rotation space 112 as the connection bar 103 and the support bar 102 are elastically restored, and the support bar 102 is positioned at one side of the stopper 113 and fixed by the stopper 113.

In the second embodiment of the present invention configured as described above, a predetermined number of cable winding units 100 are installed on the back panel 11 of the TV 10. The cable winding units 100 are folded in normal times, and if necessary, the cable winding units 100 are unfolded to wind and organize the cables of the TV 10 and peripheral devices.

Figure 8:
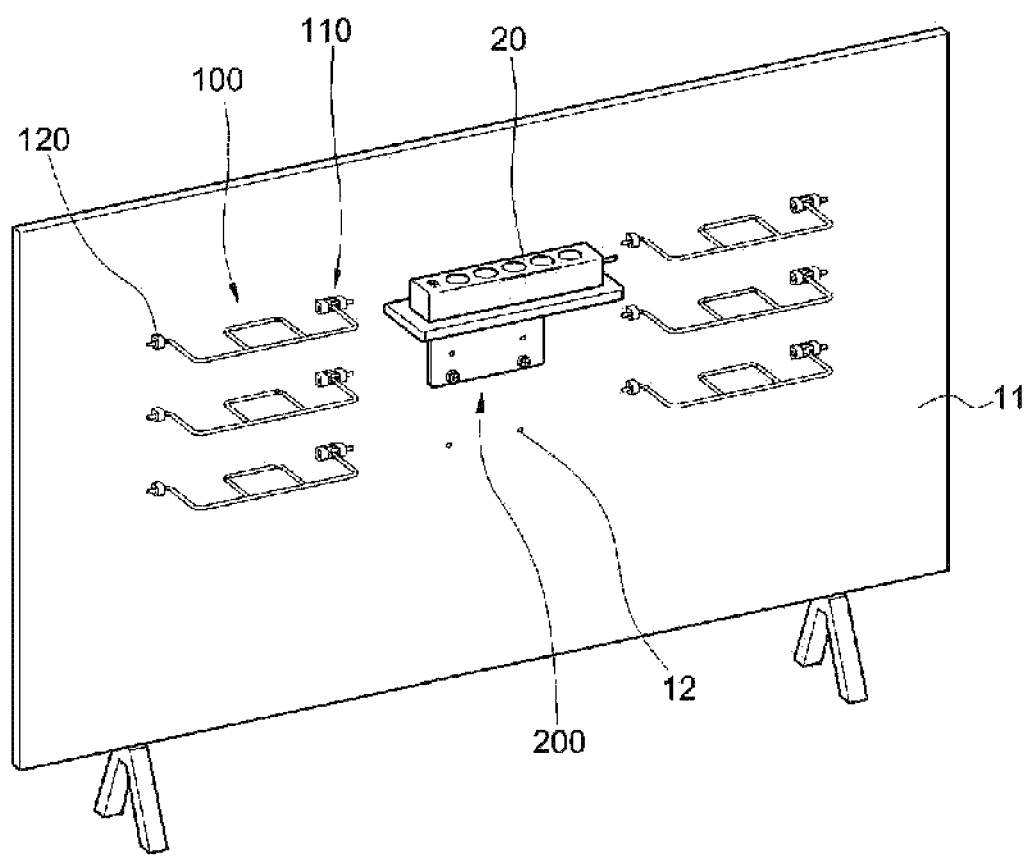
FIG. 8 is a perspective view showing a state of horizontally mounting a cable winding unit and a power strip mount according to a second embodiment of the present invention.
Figure 9:
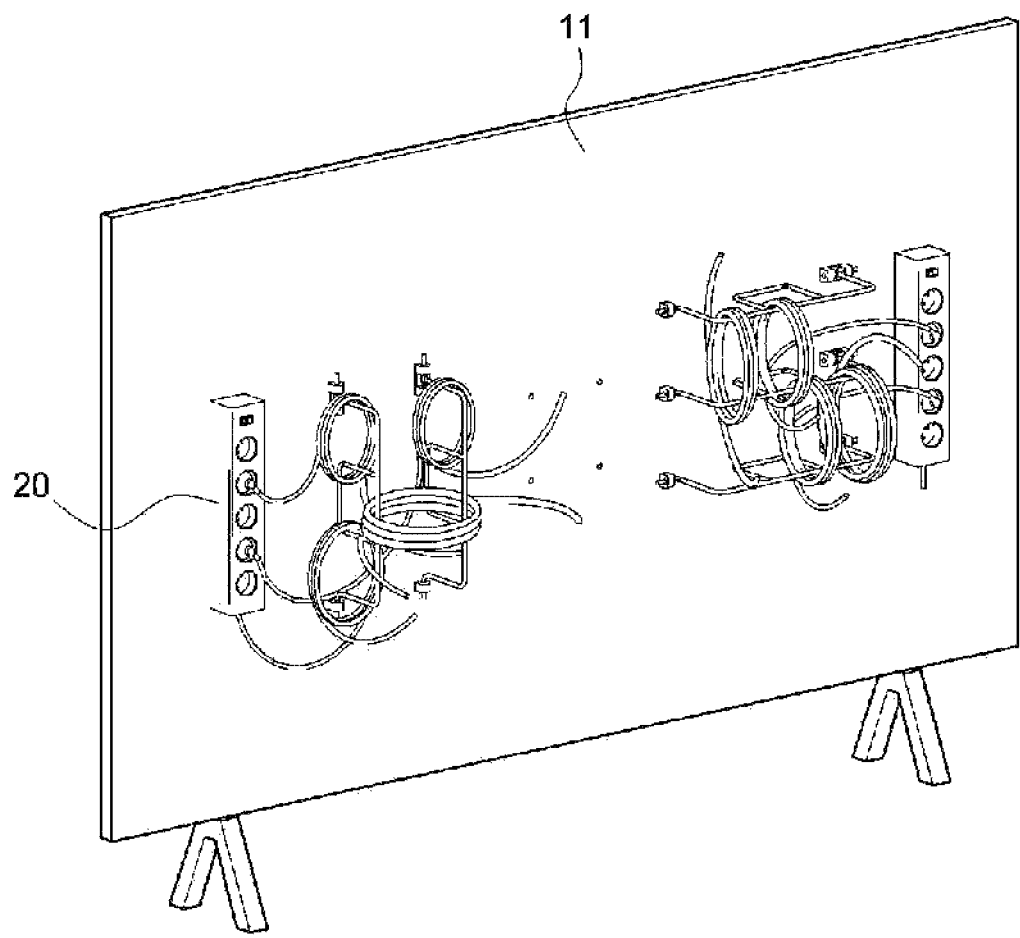
FIG. 9 is a perspective view showing a state of winding cables around a cable winding unit according to a second embodiment of the present invention.

The cable winding units 100 configured to be folded or unfolded and fixed according to the second embodiment may be installed in the horizontal direction as shown in FIG. 8 or in the vertical direction as shown in FIG. 9, and the cable winding units 100 may be installed in combination of the horizontal direction and the vertical direction.

In addition, the power strip 20 may be installed on the back panel 11 of the TV 10 using the power strip mount 200, or as shown in FIG. 9, it may be configured to directly attach a commercial power strip on the back panel 11 of the TV 10 without the power strip mount 200 by forming holes on the back panel 11 and fixing the power strip using screws through wall-mount holes of the power strip.

Although it has been described in second embodiment of the present invention that both axes 106 of the cable winding unit 100 are respectively fastened to the rotation fixing piece 110 and the hinge 120, both of the axes 106 may be fastened using the rotation fixing piece 110.

The second embodiment of the present invention configured as described above may minimize the installation space of the TV 10 by configuring the cable winding unit 100 to be folded or unfolded.

Third Embodiment

Figure 10:
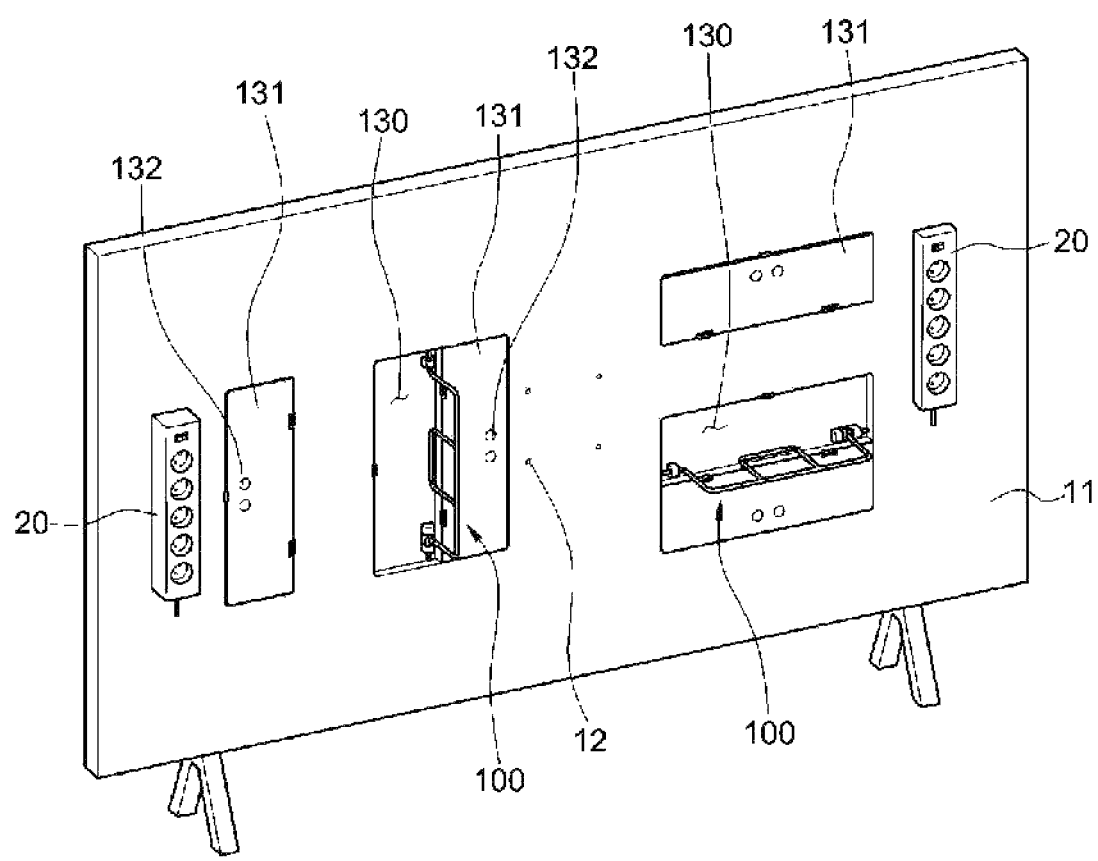
FIG. 10 is a perspective view showing a third embodiment of the present invention.
Figure 11:
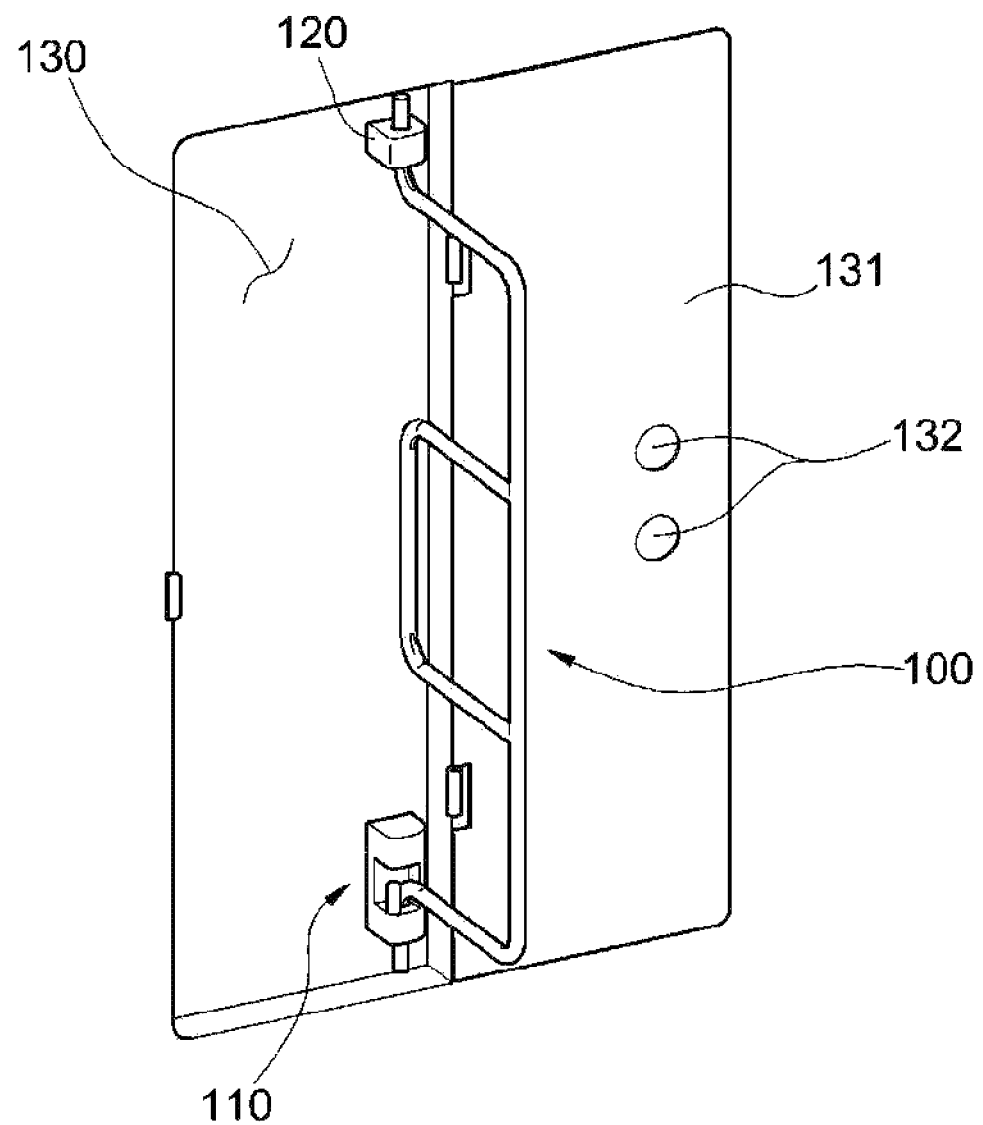
FIG. 11 is an enlarged perspective view showing a cable winding unit according to a third embodiment of the present invention.

In the third embodiment of the present invention, as shown in FIGS. 10 and 11, a storage unit 130 provided with a door 131 is formed on the back panel 11 of the TV 10 in the form of a groove to store the cable winding unit 100.

As the storage unit 130 is formed on the back panel 11 of the TV 10 in the form of a groove and the door 131 is hinge-fastened to the storage unit 130 as shown in FIG. 10, the storage unit 130 is opened and closed by opening and closing the door 131.

In addition, any one axis 106 of the cable winding unit 100 is fastened to the rotation fixing piece 110 and the other axis 106 is fastened to the hinge 120 in the storage unit 130 as shown in the second embodiment described above, or both axes 106 of the cable winding unit 100 are fastened to the rotation fixing pieces 110.

In the third embodiment configured as described above, when the cable winding units 100 is not used, the back panel 11 of the TV 100 is neatly finished by closing the door 131 after folding and storing the cable winding unit 100 inside the storage unit 130, and the cable may be neatly organized by unfolding the cable winding units 100 and winding the cables after holding the handle 132 of the door 131 and opening the door 131.

As described above, since the TV-integrated cable organization device of the present invention organizes power cables and signal cables of a TV and various peripheral devices connected to the TV by winding the cables on the back panel of the TV, the appearance looks clean as the cable are not seen from the front of the TV, and since the cables are wound and organized after being classified by the TV and the peripheral devices connected to the TV, the cables can be promptly and conveniently separated when a peripheral device is disconnected.

The technical spirit of the present invention has been described through several embodiments described above.

It is apparent that those skilled in the art may diversely modify or change the embodiments described above from the description of the present invention.

In addition, although it is not explicitly shown or described, it is apparent that those skilled in the art may make modifications of various diverse forms including the spirit of the present invention from the description of the present invention, and this still falls within the scope of the present invention.

The embodiments described above with reference to the accompanying drawings are described for illustrative purposes, and the scope of the present invention is not limited to the embodiments.

The invention claimed is:

1. A TV-integrated cable organization device, comprising:
a predetermined number of cable winding units configured to be installed on a back panel of a TV, the predetermined number of cable winding units including:
   a pair of support bars spaced apart from each other by a predetermined distance, one end of which is fastened to the back panel of the TV by a fastener;
   a connection bar for connecting end portions of the pair of support bars; and
   a power strip mount for fastening and fixing a power strip on the back panel, the power strip including:
      a fixing plate having fastening holes corresponding to VESA holes of the back panel; and
      a support plate having fastening holes corresponding to the fastening holes of the fixing plate at one side and attaching the power strip,
   wherein the fixing plate is fixed to the back panel by fastening bolts in the fastening holes of the fixing plate and the VESA holes of the back panel, and the support plate is fixed to the fixing plate by fastening bolts in the fastening holes of the fixing plate and the fastening holes of the support plate.

2. The device according to claim 1, further comprising:
auxiliary support bars formed on the connection bar in a direction perpendicular to the connection bar.

3. The device according to claim 2, further comprising:
an auxiliary connection bar formed between the auxiliary support bars in a direction parallel to the connection bar.

4. The device according to claim 1, wherein each of the pair of support bars has an axis formed at an end portion thereof, wherein one of the axes of the pair of support bars is fastened to the back panel using a hinge, and the other axis of the pair of support bars is fastened to a rotation fixing piece so as to rotate and fix the predetermined number of cable winding units in a folded or unfolded state.

5. The device according to claim 4, wherein the rotation fixing piece includes:
a body fastened to the back panel;
a rotation space formed in the body in a form of a groove, into which one of the pair of support bars is inserted; and
a stopper with an open side formed in the rotation space to be protruded in a direction perpendicular to the pair of support bars,
wherein, as the connection bar or the pair of support bars is elastically strained and one of the pair of support bars moves from an inside of the rotation space to the open side of the stopper and rotates, the predetermined number of the cable winding units is folded or unfolded, and wherein, as the connection bar or the pair of support bars is elastically restored and one of the pair of support bars moves from the inside of the rotation space to one side of the stopper, the predetermined number of the cable winding units is fixed in a folded or unfolded state.

6. The device according to claim 5, wherein a storage unit is formed on the back panel in a form of a groove,
wherein the rotation fixing piece is fastened to any one axis of the predetermined number of cable winding units so that the predetermined number cable winding units is stored and folded or unfolded in the storage unit.

7. The device according to claim 6, wherein a door is hinge-fastened to the storage unit to open and close the storage unit.

* * * * *